United States Patent [19]

Slaght

[11] 4,242,036
[45] Dec. 30, 1980

[54] REMOTELY OPERATED PLACEMENT EQUIPMENT

[75] Inventor: William F. Slaght, Ste-Foy, Canada

[73] Assignee: Her Majesty the Queen in right of Canada, Ontario, Canada

[21] Appl. No.: 833,293

[22] Filed: Sep. 2, 1977

[30] Foreign Application Priority Data

Sep. 15, 1976 [CA] Canada .................................. 261234

[51] Int. Cl.³ .............................................. B60P 3/28
[52] U.S. Cl. ..................................... 414/737; 180/6.7; 180/9.32; 305/15; 305/33; 305/52; 414/909
[58] Field of Search .............. 46/253; 86/1 B; 102/19; 180/6.7, 9.22, 9.32; 244/3.12; 305/39, 52; 414/737, 909

[56] References Cited

U.S. PATENT DOCUMENTS

| | | | |
|---|---|---|---|
| 1,350,220 | 8/1920 | Graham | 102/19 |
| 1,407,969 | 2/1922 | Wickersham | 102/19 |
| 2,586,239 | 2/1952 | MacKenzie | 46/253 |
| 2,751,259 | 6/1956 | Bonmartini | 305/52 |
| 3,086,465 | 5/1960 | Montfort | 102/19 |
| 3,283,947 | 11/1966 | Erickson | 244/3.12 |

FOREIGN PATENT DOCUMENTS 310565  1/1919  Fed. Rep. of Germany .......... 180/9.32

*Primary Examiner*—Stephen C. Bentley
*Attorney, Agent, or Firm*—Stevens, Davis, Miller & Mosher

[57] ABSTRACT

The present invention relates to a track vehicle. The vehicle is comprised of a lightweight frame having a platform or deck portion and first and second track guiding portions. Drive drums are provided, located at one end of each of the track guiding portions. First and second electric motors are connected, via gear reducers, each to one of the drive drums. Idler rollers are located at the other end of each of the track guiding portions. First and second tracks are provided, each encircling and operatively associated with one of the drive drums, one of the track guiding portions and one of the idler drums. Each of the track guiding portions has a bottom portion with each bottom portion having a longitudinally oriented strip of low friction material fastened thereto to provide a sliding surface for each of the tracks when the vehicle is in motion. In another embodiment of the invention the deck portion and track guiding portions are blow-formed from sheet plastics material. When the plastic embodiment is manufactured the longitudinally oriented strips are eliminated and the track runs directly on the plastic surface of the track guiding portions. Further, in the plastic embodiment the idler drums are eliminated and the tracks merely slide over rounded ends of the track guiding portion.

22 Claims, 7 Drawing Figures

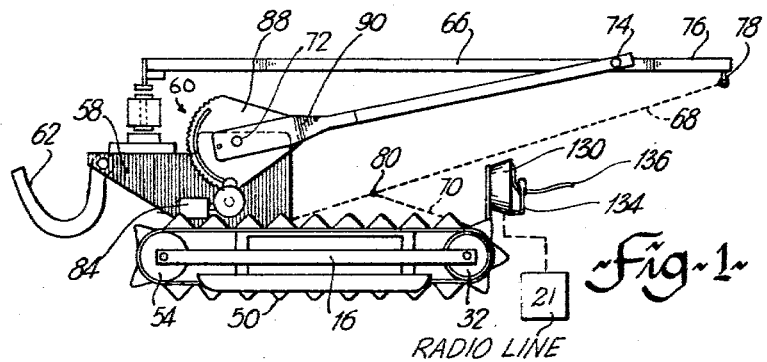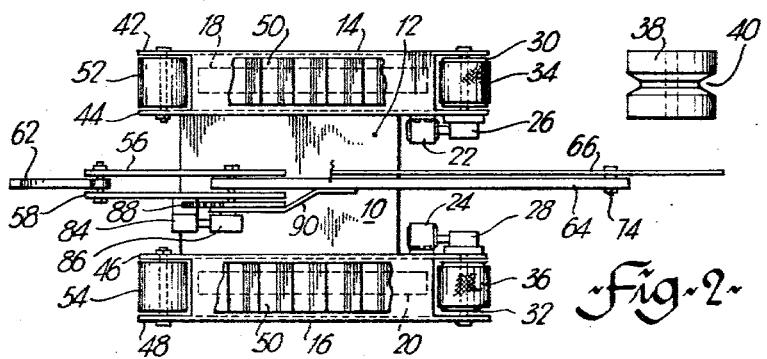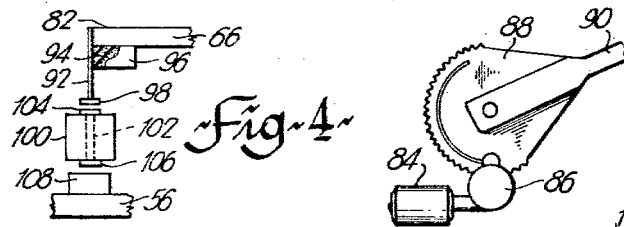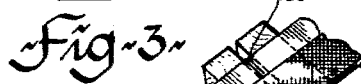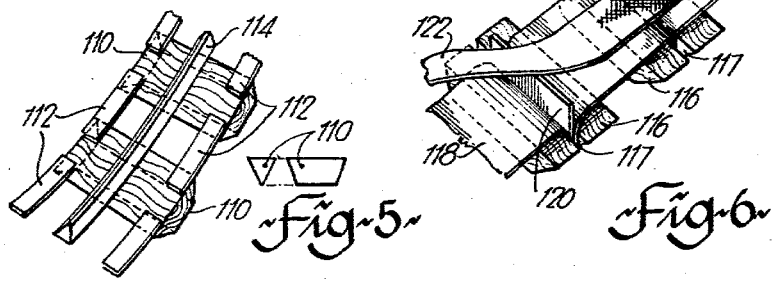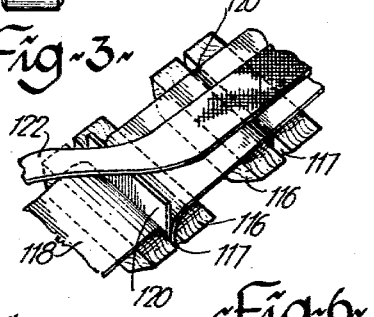

REMOTELY OPERATED PLACEMENT EQUIPMENT

The present invention relates to a vehicle which can be remotely operated. The vehicle has many uses, for example, when equipped with a closed circuit television camera the vehicle can enter buildings filled with gas or which are structurally dangerous and seek out, via the operators control, injured people or the like. The vehicle, because it is relatively inexpensive, can also be used to disrupt improvised explosive devices. The vehicle is equipped with an obstacle hook at its front end so that it is capable of camming itself over obstacles and even up stairs.

One embodiment of the vehicle uses a multiconductor cable connecting the vehicle to a remote location from which the vehicle is controlled. This embodiment of the vehicle has at its rear end a cable storage and a cable unloading device for paying out cable as the vehicle moves. This arrangement has a marked advantage over a system where the vehicle merely drags the cable after it. With the system according to the present invention the cable is substantially stationary with respect to the ground which reduces the possibility that the cable will snag and impede the forward advancement of the vehicle.

The vehicle carries batteries which power two electric motors which are connected to vehicle tracks. In addition the vehicle is equipped with a movable boom which can hold a TV camera and/or a disruptor or the like. The boom is positioned by a third electric motor powered by the battery. The operation of all of the motors is controlled by an operator at a remote location. It is contemplated that control could be accomplished via a standard radio link or by a multiple conductor cable as mentioned above.

The tracks on which the vehicle moves are of a novel design. One embodiment employs a series of wooden blocks forming the treads or cleats interconnected by vinyl strips forming links. A V-belt is fastened to the track at each wooden block. The motor-gear reducer units used to drive each track drives a V-pulley. The assembled track is fitted over this pulley at the rear of the vehicle and over an idler pulley at the front of the vehicle. A second embodiment uses the wooden blocks as treads or cleats for the track. The blocks are fastened together by means of a central nylon or fiberglass belt. A strip of *Velcro tape is secured overtop the nylon belt and in registration with it. Mating *Velcro material is secured to drive drums at the rear of the vehicle. The track is mounted on the vehicle over the drive drum at the rear end and over an idler drum at the front end of the vehicle. The *Velcro on the drive drum cooperates with the *Velcro strip on the tracks to provide a positive drive without the necessity of using sprockets, chains and the like. In addition, the *Velcro-nylon track assembly can be operated over a drum having a small diameter without running into the problems of frictional torque losses. As a result, the *Velcro-nylon track can be used in conjunction with a drum having a much smaller diameter than the pulley used in the V-belt embodiment so that it is possible to eliminate a 2:1 gear reducer with the *Velcro equipment while maintaining the same drive torque at the track.
*trademark A third embodiment of the track eliminates the central or fiberglass belt. The track merely has the cleats or treads fastened to the *Velcro tape. The tape is double faced at its ends and the track is mounted on the vehicle by merely looping it around the drive drum and the track guiding portion of the frame and connecting the ends of the *Velcro tape together at its double faced portion. This embodiment when used in conjunction with the plastic formed vehicle further eliminates the need for idler drums. The track merely slides around the end of the track guiding portion in a smooth curved recess provided therefore. It should also be noted that the wooden treads or cleats can be made from a plastic material.
*trademark Nylon or teflon strips are located on the frame of one embodiment of the vehicle directly adjacent the tracks to give the track a smooth low friction surface on which to slide. This configuration provides another advantage for the vehicle according to the present invention, in that it eliminates the need for bogie wheels as in known prior art track vehicles. This advantage is three-fold in that it reduces the complexity of the track assembly which reduces the weight of the vehicle and its cost. It is contemplated that the vehicle will be used to disrupt explosives and so it is imperative that the vehicle be inexpensive and expendable although tests have shown that the vehicle itself is not usually destroyed when preforming such tasks.

Known track vehicles which are controlled from a remote location or which are capable of climbing stairs are relatively bulky, expensive and by no means expendable.

It is therefore an object of the present invention to provide a lightweight inexpensive vehicle for use in detonating explosives from a remote location.

It is a further object of the present invention to provide a vehicle capable of traveling over fairly rough terrain including stairs, curbs and sidewalks.

According to the present invention there is provided a remotely operated track vehicle comprising:

a lightweight frame having a deck portion and first and second track guiding portions;

a drive drum located at one end of each said track guiding portions;

first and second electric motors connected each to one of said drive drums;

first and second track means each encircling and operatively associated with one of said drive drums and one of said track guiding portions; and, each of said track guiding portions having a bottom having a longitudinally oriented strip of low friction material fastened thereto to provide a sliding surface for each of said tracks when said vehicle is in motion.

The present invention will be described in detail hereinbelow with the aid of the accompanying drawings, in which:

FIG. 1 is a schematic representation of a side view of one embodiment of the present invention;

FIG. 2 is a schematic representation of a top view of the embodiment shown in FIG. 1 with the tracks removed and with various portions partially broken away;

FIG. 3 is a partial view of the boom manipulation mechanism of the embodiment shown in FIG. 1;

FIG. 4 is a schematic view of the detonation holder assembly according to the present invention; and, FIGS. 5, 6 and 7 are perspective views of a portion of three different embodiments of the tracks for the vehicle according to the present invention.

Figure 7:
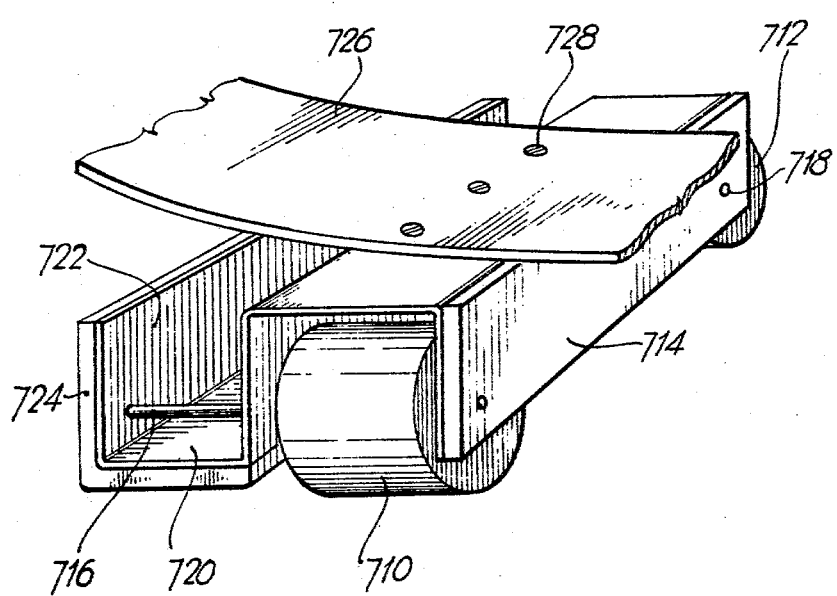

It should be understood that the vehicle can be used to accomplish many different tasks. The invention will be described in detail with reference to a vehicle which is used to disrupt explosive devices. However, it should be understood that the invention is not limited to a vehicle specifically adapted to disrupt explosive devices.

Referring to FIGS. 1 and 2, the vehicle is built around a frame 10. The frame can be made from wood or plastic and consists of a deck portion 12 and two track guiding portions 14 and 16. The material from which the vehicle is made is not critical except that it should be lightweight and since there is a possibility that the vehicle will be destroyed by explosion it is preferred that its shrapnel content be minimized.

The bottom side of the two track guiding portions are fitted with nylon or teflon strips 18 and 20 which provide a low friction surface on which the tracks slide when the vehicle is in operation. The deck portion houses the batteries and relay control equipment (not shown) which provides the source of power for the vehicle. The relay control equipment is of a known design and is itself controlled via either a radio link 21 or by a multiconductor cable from a remote location. The relay control equipment controls the source of power to provide forward, slow forward and reverse functions to the vehicle. The control for each track is duplicated and so by choosing different motive functions for each track the vehicle can be steered. The control circuit does not supply power to the motors as a step function. Power is slowly applied so that the vehicle accelerates slowly from a stop to maximum forward speed. Similarly the control system allows for a relatively slow and smooth deceleration of the vehicle. By pulsing the control system a very slow creep ahead speed can be maintained when the vehicle approaches an object. In addition the relay control equipment controls power to move the boom and to control an electromagnet used in the disruptor storage mode to be described below.

Two electric motors 22 and 24 are provided for driving the vehicle. Each electric motor drives a gear reducer 26 and 28. The gear reducer also transfers the rotational motion through 90° to drive power drums 30 and 32 located on opposite sides of the vehicle at the rear. One embodiment of the vehicle uses power drums having *Velcro bands 34 and 36 located thereon. Another embodiment of the vehicle uses four drums, one on each corner of the vehicle, like the single drum 38 shown to the left of the vehicle in FIG. 2. This type of power drum is used with tracks which are partially formed by a V-belt and, as a result, have a V-belt pulley groove 40 located therein. In order to reduce torque losses due to friction encountered when the V-belt operates around a radius, the diameter of the drum 38 must be approximately twice that of the drum 30. In order to obtain the same motive torque at the track the gear ratio of the gear reducers 26 and 28 must be increased by a factor of approximately 2:1. These frictional losses are not encountered when using the *Velcro embodiment and it has been found that the *Velcro track is capable of operating with drums having a relatively small diameter.

*trademark

Each track guiding portion 14 and 16 is provided with side members 42, 44, 46 and 48. The side members stiffen the vehicle frame and provide bearing surfaces for the shafts of the power drums 30 and 32. The tracks, one of which is shown as 50 in FIG. 1, are stretched between the power drums 30, 32 and idler drums 52, 54 respectively. The idler drums are located at the front corners of the vehicle. It should be noted that if the V-belt embodiment is employed, the front idler drums 52 and 54 must be of the V-belt pulley type shown as 38 in FIG. 2. In the plastic embodiment the side members are formed as an integral part of the vehicle.

Vertically oriented support plates 56 and 58 are mounted on the deck portion of the frame. The support plates hold the boom assembly generally indicated by 60 in FIG. 1, and an obstacle hook 62. The hook is counterbalanced so that when the vehicle is moving forward and comes into contact with an obstacle, as for example a stair, the bottom portion of the hook comes into contact with it and the tracks force the hook across the top surface of the obstacle. This action "cams" the front end of the vehicle upwardly so that the front portion of the tracks contact the surface of the obstacle and pass over the top surface of the obstacle. In this manner, the vehicle according to the present invention can traverse obstacles such as curbs, sidewalk risers and stairs.

The boom assembly 60 is comprised of a primary arm 64, a secondary arm 66 and chains 68 and 70. Primary arm 64 rotates about an axial 72 in the support plates. Arm 66 rotates about a pivot point 74 in the primary arm. Secondary arm 66 includes an extension portion 76 which joins the chain at a pivot point 78, the junction of the chains 68 and 70 form yet another pivot point 80. The combination of the primary arm 64 from the pivot point 72 to the pivot point 74, the extension arm 76 and the chain portion joining pivot points 78 and 80 form a four bar linkage. When the chain 70 is connected to the chain 68 so that the pivot point 80 is positioned so as to yield a parallel four bar linkage, the secondary arm 66 will remain parallel to the frame of the vehicle and move forwardly as the primary arm 64 is rotated upwardly about axle 72. In this way, the end 82 of the secondary arm may be located forward of the vehicle. By changing the location of the pivot point 80 it is possible to position the end 82 forwardly and upwardly of the vehicle.

Rotation of the primary arm 64 and therefore the positioning of the end 82 of the secondary arm 66 is accomplished by activation of electric motor 84 best seen in both FIGS. 2 and 3. Motor 84 drives a gear reducer 86 which in turn drives a sector gear 88 which is connected to primary arm 64 via a bracket arm 90. Motor 84 is secured to vertical support plate 58.

As mentioned above, the vehicle can be used to disrupt explosive charges by carrying an explosive disruptor to the location of the explosive, placing the disruptor in close proximity to the explosive and by then activating the disruptor. Activation of the disruptor in close proximity to the explosive device results in the non explosive rapid dissasembly of the explosive device thereby rendering it relatively harmless. FIG. 4 shows an arrangement according to the present invention for storing the disruptor during transport. At the end 82 of the secondary beam 66 there is located a flexible metal strip 92. Oscillation of the flexible metal strip is damped by virtue of the strip contacting a foam rubber block 94 which is held in place at the end of the arm 66 by side plates, one of which is shown as 96 in FIG. 4. The flexible metal strip 92 is terminated in a magnet 98, preferably a ceramic magnet. The disruptor 100 is located in a hose clamp 102. Magnet plates 104 and 106 are secured to the top and bottom of the hose clamp respectively. The top plate 104 is matable with the magnet 98 thereby securing the disruptor to the boom assembly 60 shown in FIG. 1. An electromagnet 108 is secured to vertical support plate 56. The electromagnet 108 is matable with magnet plate 106 secured to the disruptor by the hose clamp. During movement of the vehicle the disruptor is positioned on the vehicle by electromagnet 108 and the boom is oriented so that permanent magnet 98 is located away from magnet plate 104. When it is desired to move the distruptor with the boom the magnet 98 is moved into contact with plate 104. This action disconnects the electromagnet 108 and allows the disruptor to be moved off its resting place.

As was mentioned above, the material from which the vehicle is made can be wood or a lightweight plastic. However, in order to stiffen the secondary arm 66 one embodiment according to the present invention has an aluminum L-shaped reinforcing strip longitudinally connected therewith.

As an additional safety precaution the disruptor control system is such that the disruptor's energizing leads are short circuited when the disruptor is in the rest position.

The three embodiments for the track of the vehicle are shown in FIGS. 5, 6 and 7. With regard to FIG. 5 the track is comprised of a plurality of wood or plastic cleats or treads 110. A side and end view of a typical cleat is shown in the rightmost part of FIG. 5. The cleats are formed into an endless belt or track by means of nylon or vinyl strips 112 which connect the outside top portion of adjacent cleats. A driving V-belt 114 is connected to the center part of each cleat. In operation, the track is located over a drive drum and an idler drum of the type shown at 38 in FIG. 2. The V-belt fits into pulley slot 40 and its registration therewith locates the track with respect to the frame of the vehicle and drives the track with respect to the frame of the vehicle. The nylon strips 112 rest and slide on the teflon strips 18, 20 located on the frame of the vehicle. This configuration provides a relatively friction free operation.

The second embodiment of the track according to the present invention is shown in FIG. 6. The track consists of a plurality of cleats 116 similar to the cleats 110 shown in FIG. 5 except that they have a longitudinal slot 117 cut therein. An endless belt 118 of nylon or fiberglass forms the body of the track. Each cleat 116 has a wedge piece 120 associated with it. The fiberglass belt is dressed into each slot in the cleats and then the wedge is inserted and fixed in the slots so that it sandwiches the belt between the interior walls of the slot 120 and the exterior walls of the wedge. In this manner each of the cleats is securely fastened to the endless belt. A *Velcro strip 122 is then longitudinally secured to the fiberglass belt. In operation, the *Velcro belt contacts one of the *Velcro bands 34 or 36 located on drive drums 30 or 32. This arrangement provides for a positive drive of the track by the drive drum. It should be noted that the idler drums employed with this embodiment do not have *Velcro bands located thereon.

It has also been found that the fiberglass or nylon belt 118 can be replaced by a *Velcro belt thereby eliminating the need for *Velcro belt 122. If this configuration is used the ends of the *Velcro belt is double faced and the ends are simply pressed together to form the endless track. If this type belt is used in conjunction with the plastic vehicle the front idler drums are eliminated and the track slides on a curved recessed plastic surface on the track guiding portion.

*trademark

FIG. 7 illustrates yet another alternate embodiment of a cleat or tread. The torque required to turn a moving track vehicle is, to a large extent relatable to the magnitude of the side drag imposed on the track cleats. The cleat according to FIG. 7 is designed to reduce this side drag and to therefore reduce the torque required to turn the vehicle. In reducing the side drag it is important to maintain good traction for the cleat when the vehicle is moving. FIG. 7 illustrates a cleat which uses side mounted rollers 710 and 712 to reduce side drag. The rollers are mounted in a high impact plastic "S" shaped cleat 714 by axles 716 and 718. The bottom and trailing sides 720 and 722 respectively of the "S" shaped cleat are covered with a rubber pad 724 to add traction to the cleat. The cleat is fastened to the *Velcro belt 726 by rivets 728. In order to limit side slip when the vehicle is negotiating slopping terrains the cleats on each track are towed in by approximately 10°.

The vehicle contemplated for use with a multiconductor cable has a cable storage drum 130 mounted on the rear of the frame 132, see FIG. 1. The multiconductor cable 136 is threaded through the eye of a wire hook 134. The forward motion of the vehicle pulls the cable 136 from the holding drum 130 through the eye of hook 134 thereby paying out the cable in a neat manner which is relatively snag free. The plastic embodiment of the vehicle provides a cable storage facility as a dishlike depression molded into the deck portion of the vehicle.

The plastic embodiment according to the present invention has many advantages over other vehicles of the same type. It is a lightweight vehicle, approximately 40 lbs. which can be transported in the trunk of an automobile. Due to its lightweight construction the vehicle can be handled and set up by one man. The novel track design allows for a track replacement by one man in under one minute. Finally, the novel track design provides zero slippage of the track drive when the vehicle is driven through ice, water and mud.

I claim:

1. A remotely operated track vehicle comprising:
   a lightweight frame having a deck portion and first and second track guiding portions;
   a drive drum located at one end of each said track guiding portions;
   first and second electric motors connected each to one of said drive drums;
   first and second track means each encircling and operatively associated with one of said drive drums and one of said track guiding portions; and
   an obstacle hook pivotally mounted on said deck portion, said obstacle hook being oriented forward of the vehicle and located above the ground so that the bottom portion of said obstacle hook will ride up onto the surface of an obstacle in a camming action, said pivot point being above the level of said track means and a camming surface extending downwardly at an acute angle from said pivot point toward said track means to permit the track means to engage the obstacle to move said vehicle over the obstacle as said vehicle is moved forward.

2. A remotely operated track vehicle according to claim 1, wherein each said track guiding portions are provided at their end opposite said drive drum with an idler drum adapted to guide said track means.

3. A remotely operated track vehicle according to claim 1, wherein said tracks are comprised of a plurality of spaced lightweight cleats, each cleat being connected to an adjacent cleat by two vinyl strips, said track further comprising a V-belt centrally connected to each cleat, for co-operation with corresponding V-belt pulley grooves in said drive drums and idler drums.

4. A remotely operated track vehicle according to claim 3, wherein said track guides are provided with a reduced friction surface.

5. A remotely operated vehicle according to claim 1, wherein said tracks are comprised of a plurality of lightweight cleats centrally interconnected by a belt means forming an endless belt wherein a Velcro ® strip is longitudinally located and secured to the inside of said endless belt and wherein said drive drums have Velcro ® bands located thereon to engage said Velcro ® strip on said track to thereby positively drive said track when rotational power is applied to said drive drums.

6. A remotely operated track vehicle according to claim 1, wherein said tracks are comprised of a plurality of lightweight cleats centrally interconnected by a Velcro ® belt means which is double faced at its end so that its ends may be connected together to form an endless belt and wherein said drive drums have Velcro ® bands located thereon to engage said Velcro ® strip on said track to thereby positively drive said track when rotational power is applied to said drive drums.

7. A remotely operated track vehicle according to claim 5 or 6, wherein said cleats each have a longitudinally oriented slot located therein and where said belt means is held securely in each of said slots by a wedge so as to secure said cleats to said belt.

8. A remotely operated track vehicle according to claim 1, wherein said tracks comprise endless belt means and a plurality of cleat means fastened to and spaced about said endless belt means, each of said cleat means including roller means oriented for rotation about an axis parallel to the longitudinal axis of said endless belt.

9. A remotely operated track vehicle according to claim 7, wherein said endless belt means is a Velcro ® belt which has its ends double faced so that they may be connected together to form said endless belt and wherein said drive drums have Velcro ® bands located thereon to engage said Velcro ® strip on said track to thereby positively drive said track when rotational power is applied to said drive drums.

10. A remotely operated track vehicle according to claim 1 wherein said tracks are comprised of a plurality of spaced lightweight cleats, each of said cleats being of a hard plastic material squared "S" shaped body, said body having a pair of rollers mounted in one end thereof, the other end of said "S" shaped body being covered with a rubber material to increase cleat traction.

11. A remotely operated track vehicle according to claim 10, wherein said cleats are towed inwardly by approximately 10° with respect to the longitudinal axis of said vehicle.

12. A remotely operated track vehicle according to claim 5 or 6, wherein said lightweight cleats are made of plastic or wood.

13. A remotely operated track vehicle according to claim 1, wherein a boom assembly is located on said deck portion of said frame, said boom assembly being comprised of a boom support, a primary beam pivotally mounted at one end of said support, a secondary beam pivotally mounted at an intermediate point between its ends to the other end of said primary beam and a chain assembly connecting that end of the secondary beam closest to its pivot point to the vehicle frame so that the primary beam, that portion of the secondary beam between its pivot point and the chain, form a four bar linkage so that upon rotation of the primary beam the secondary beam moves forward of the vehicle.

14. A remotely operated track vehicle according to claim 13, wherein the primary beam is rotated by an electric motor driving a gear reducer and a sector gear, said sector gear being mounted integrally with said primary beam.

15. A remotely operated track vehicle according to claim 14, wherein said sector gear is connected to said primary beam via an auxiliary arm.

16. A remotely operated track vehicle according to claim 13, 14 or 15, wherein said sector gear is connected to said primary beam via an auxiliary arm.

17. A remotely operated track vehicle according to claim 1, wherein said vehicle is connected to a remote location via a multiconductor cable, said vehicle including a multiconductor cable storage bin at its rearward end, said bin including a cable hook through which the cable is threaded and through which the cable moves as the vehicle moves away from the remote location.

18. A remotely operated track vehicle according to claim 1, wherein said vehicle is connected to a remote location via a radio link.

19. A remotely operated track vehicle according to claim 13, wherein the end of said secondary beam opposite the end to which the chain assembly is attached is provided with a disruptor holder, said disruptor holder comprising a flexible metal strip connected at one end to said secondary beam and at the opposite end to a permanent magnet.

20. A remotely operated track vehicle according to claim 19, wherein a disruptor is provided, said disruptor having a magnet support plate connected to its top for operative association with said permanent magnet and a second magnet support plate located at its bottom for cooperation with an electromagnet, said electromagnet being connected to said boom support.

21. A remotely operated track vehicle according to claim 20, wherein said electromagnet is energized to hold said disruptor on said vehicle during movement of said vehicle and wherein said permanent magnet, when in contact with said top support plate de-energizes said electromagnet.

22. A remotely operated track vehicle according to claim 1, wherein the frame is made of plastics material and wherein the deck portion and the track guiding portions are formed as one piece.

* * * * *